(12) United States Patent
Pesonen (10) Patent No.: US 10,439,869 B2
(45) Date of Patent: Oct. 8, 2019

(54) APPLICATION CONFIGURING

(71) Applicant: ROVIO ENTERTAINMENT LTD., Espoo (FI)

(72) Inventor: Mika Pesonen, Espoo (FI)

(73) Assignee: ROVIO ENTERTAINMENT LTD., Espoo (FI)

( * ) Notice: Subject to any disclaimer, the term of this patent is extended or adjusted under 35 U.S.C. 154(b) by 654 days.

(21) Appl. No.: 14/224,207

(22) Filed: Mar. 25, 2014

(65) Prior Publication Data

US 2015/0280979 A1 Oct. 1, 2015

(51) Int. Cl.
| | |
|---|---|
| *H04L 12/24* | (2006.01) |
| *H04L 29/08* | (2006.01) |
| *H04W 4/08* | (2009.01) |
| *H04L 12/26* | (2006.01) |
| *H04W 4/50* | (2018.01) |

(52) U.S. Cl.
CPC ...... *H04L 41/0806* (2013.01); *H04L 41/0856* (2013.01); *H04L 67/22* (2013.01); *H04W 4/08* (2013.01); *H04W 4/50* (2018.02); *H04L 43/0876* (2013.01)

(58) Field of Classification Search
CPC . H04L 41/08; H04L 41/0806; H04L 41/0856; H04L 43/0876
USPC .................................................. 709/220, 222
See application file for complete search history.

(56) References Cited

U.S. PATENT DOCUMENTS

| | | | | |
|---|---|---|---|---|
| 6,970,924 B1* | 11/2005 | Chu | ............. | H04L 41/5067 709/224 |
| 7,412,516 B1* | 8/2008 | Brown | ............. | H04L 41/0806 709/224 |
| 7,925,723 B1* | 4/2011 | Amidon | ............. | G06Q 10/107 706/45 |
| 7,925,874 B1* | 4/2011 | Zaitsev | ............. | G06F 9/44505 713/1 |
| 9,111,219 B1* | 8/2015 | Mohla | ............. | G06N 5/02 |
| 2002/0138443 A1* | 9/2002 | Schran | ............. | G06Q 20/382 705/64 |
| 2011/0283138 A1* | 11/2011 | Sangubhatla | ....... | H04L 41/0813 714/15 |
| 2013/0254880 A1* | 9/2013 | Alperovitch | ............ | G06F 21/51 726/22 |
| 2014/0122702 A1* | 5/2014 | Jung | ............. | H04L 43/0876 709/224 |

* cited by examiner

*Primary Examiner* — Tonia L Dollinger
*Assistant Examiner* — Adam A Cooney
(74) *Attorney, Agent, or Firm* — Squire Patton Boggs (US) LLP (57) ABSTRACT

Defining a configuration settings for an application is described. Performance data and device specification information is used to define a configuration data set, which is provided to a user device running the application. Settings of the application are further optimized according to the configuration data set.

19 Claims, 6 Drawing Sheets

APPLICATION CONFIGURING

TECHNICAL FIELD

Examples of the present invention relate to configuring applications. More specifically, the examples of the present invention relate to methods, apparatuses and a related computer program product for automatically configuring applications running in a device or a group of devices.

BACKGROUND

Variety of different user devices, like mobile phones, gaming devices, laptops, tablets, PCs nowadays is huge and growing. For example there are thousands of mobile device models with individual model numbers. In order to provide good user experience application developers need to optimize settings for different devices and with a wide install base it is challenging. The settings may be optimized for each user device with the individual model number manually but it requires a lot of resources especially when the settings are tested on the user devices. Therefore there is a need for an approach for defining an automated configuration for an application running on a user device.

SUMMARY

According to one example embodiment, a method comprises obtaining performance data from at least one user device and device specification of the at least one user device. The performance data and the device specification are analysed and based on which a configuration data set is created. The configuration data set is then sent to the user device.

According to another example embodiment, a method comprises running an application in a user device and measuring performance data relating to running the application. Information related to the measured performance data and the device specification is sent for analysis and a configuration data set is received. The application is configured according at least partly to the configuration set.

According to another example embodiment, a system comprises at least one user device to run an application. The application being configured to measure performance data relating to running the application and sending the performance data and information relating to a specification of the device. The system further comprising a server to receive and analyse the performance data and information relating to the device specification and to configure a configuration data set based on the analysis, and to send the configuration data set to the user device. The configuration data set is received at the user device and the application running in the user device is configured to optimise the application at least partly according to the configuration data set.

According to another example embodiment, a computer program product including one or more sequences of one or more instructions which, when executed by one or more processors, cause an apparatus to at least perform the steps of at least:
obtaining performance data from at least one user device;
obtaining device specification information from the at least one user device;
analysing the performance data and the device specification information;
determining a configuration data set based on the analysis;
sending the configuration data set to the user device.

According to another example embodiment, a computer program product including one or more sequences of one or more instructions which, when executed by one or more processors, cause an apparatus to at least perform the steps of at least:
running an application in a user device;
measuring performance data relating to running the application;
sending the performance data;
sending device specification information;
receiving a configuration data set;
configuring the application according at least partly to the configuration set.

According to another example embodiment, an apparatus comprising means for:
obtaining performance data from at least one user device;
obtaining device specification information from the at least one user device;
analysing the performance data and the device specification information;
determining a configuration data set based on the analysis;
sending the configuration data set to the user device.

According to another example embodiment, an apparatus comprising means for:
running an application;
measuring performance data relating to running the application;
sending the performance data;
sending device specification information;
receiving a configuration data set;
configuring the application according at least partly to the configuration set.

BRIEF DESCRIPTION OF THE FIGURES

The embodiments of the invention are illustrated by way of example—not by way of limitation, in the figures of the accompanying drawings.

DESCRIPTION OF SOME EMBODIMENTS

The following embodiments are exemplary only. Although the description may refer to "an", "one", or "some" embodiment(s), this does not necessarily mean that each such reference is to the same embodiment(s), or that the feature only applies to a single embodiment. Single features of different embodiments may be combined to provide further embodiments.

In the following, features of the invention will be described with a simple example of a system architecture in which various embodiments of the invention may be implemented. Only elements relevant for illustrating the embodiments are described in detail. Various implementations of the information system comprise elements that are suitable for the example embodiments and may not be specifically described herein.

Examples of a method, a system and a computer program product are presented for optimizing settings for an application running on a user device.

As used herein, the term "application" refers to software that contains such instructions that, when executed by one or more processors, causes a computer to perform tasks. The application may also be referred as software application, application program, application software, app and so on. It is to be noted that in at least some of the example embodiments also system software providing a platform for running the application can be considered functionally similar to the application. Alternatively, or in addition to, also set of instructions based on mark-up language like Hypertext Markup Language (HTML) and derivates like HTML5 may be considered as an application. The term computer, as used, herein, refers to any apparatus, or a combination of apparatuses, that is capable of executing the application.

As used herein, the term "user device", which is example of a computer, refers to a computing device and it may be for example a laptop, desktop computer, graphics tablet, cellular phone, multimedia system of a vehicle, an arcade gaming device, an electronic noticeboard, or any other device with capabilities for running an application.

As used herein, the term "performance data" refers to measurable characteristics of an application running on the user device. The measurable characteristics may include loading time of an application, frames per second (FPS) rate, power consumption, memory consumption, processor load etc.

The performance data may be read for example from a file system of the user device. The file system may include for example a "cpu-info" file which may include information about the actual processor or processors but also about their past and current load, speed etc. Suitable files may be available also for other components of the user device.

The performance data may be measured constantly when the application is running or at some specific times like when the application is loading or performing a specific task or a part of the specific task. The performance data may be real time or statistical data and it may include processing of the measured data.

As used herein, the term "configuration data set" refers to set of information comprising information relating to optimizing application settings. The configuration data set may include various settings affecting visual or other characteristics of the application, like resolution, frame rate, activated/deactivated features, audio settings and so on. The configuration data set may further include an identifier which can be used to identify the current configuration data set in use.

As used herein, the term "device specification information" refers to characteristic information of the user device. The information may include information relating to components used in the user device—for example type, count, speed, vendor, driver version of the components used. The components may include a central processing unit (CPU), a graphical processing unit (GPU), physical random access memory (RAM), position sensor like a gyroscope, location means like global positioning system (GPS) chip, display size and resolution etc. The device specification information may also include information relating to an operating system used and a version of it as well as other applications, drivers, libraries etc. installed on the user device.

The device specification information may further include capabilities of the user device like ability to play videos clips, multichannel voice etc. The device specification information may further include user settings defined by the user like is the application allowed to send and/or receive text messages, connect to a remote serve, use location information etc. The device specific information may further include an identifier identifying the device type or model and the device specification may be obtained from a database using the identifier. The identifier may be associated to the device specific information.

The device specification information may be retrieved always when the application is launched or running or at set time periods or when triggered by an internal or external source etc. It may be retrieved for example when the operating system or other software in the user device is updated or changed. It may also be investigated for example when a hardware component is updated, added, removed etc. or when the user updates settings manually. The device specification information may also include information about the current configuration data set used in the application.

As used herein, the term "server" refers to a physical or virtual computational entity capable of enhancing information and to perform computational tasks. The term server may refer to one entity or a group on entities configured to operate jointly.

While various aspects of the invention are illustrated and described as block diagrams, message flow diagrams, flow charts and logic flow diagrams, or using some other pictorial representation, it is well understood that the illustrated units, blocks, device, system elements, procedures and methods may be implemented in, for example, hardware, software, firmware, special purpose circuits or logic, a computing device or some combination thereof.

Figure 1:
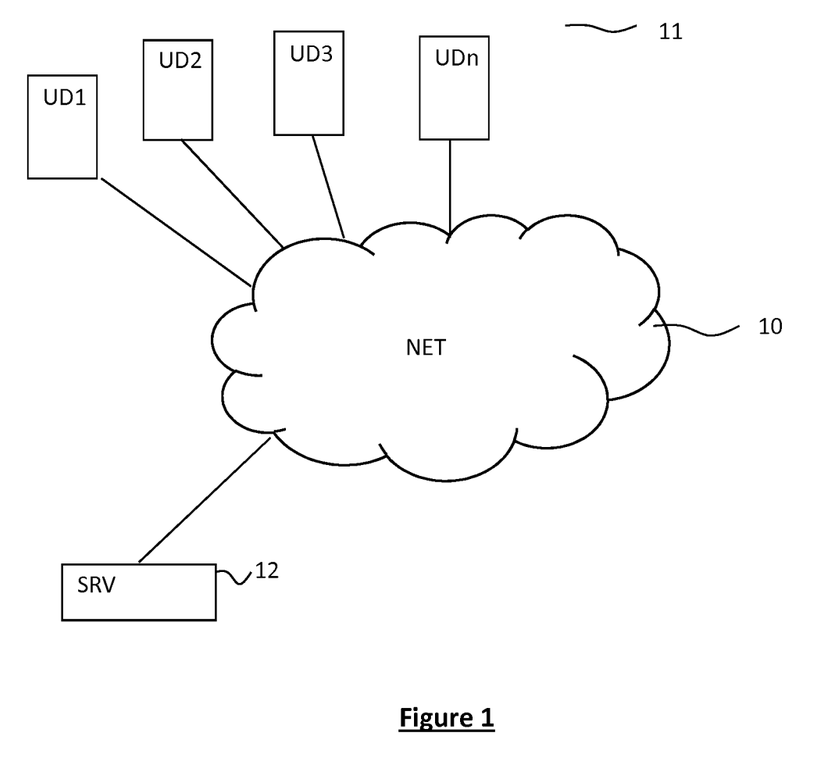
FIG. 1 illustrates a simplified arrangement where at least some example embodiments may be embodied.

FIG. 1 is a diagram of a network system capable of providing architecture for configuring application settings according to at least one example embodiment. The shown network system comprises at least one user device 11 (UD1-UDn), a server 12 (SRV) and network 10 (NET). The network 10 represents here any combination of hardware and software components that enables a process in one communication end point to send or receive information to or from another process in another, remote communication endpoint. The network 10 may be, for example, a personal area network, a local area network, a home network, a storage area network, a campus network, a backbone network, a metropolitan area network, a wide area network, an enterprise private network, a virtual private network, or a combination of any of these. The example network system of FIG. 1 is a simplified illustration depicting only few user devices 11, and one server 12. The number of the user devices 11 may vary up to several thousands and more. There is no limit to the amount of user devices 11 as the system is scalable.

Figure 2:
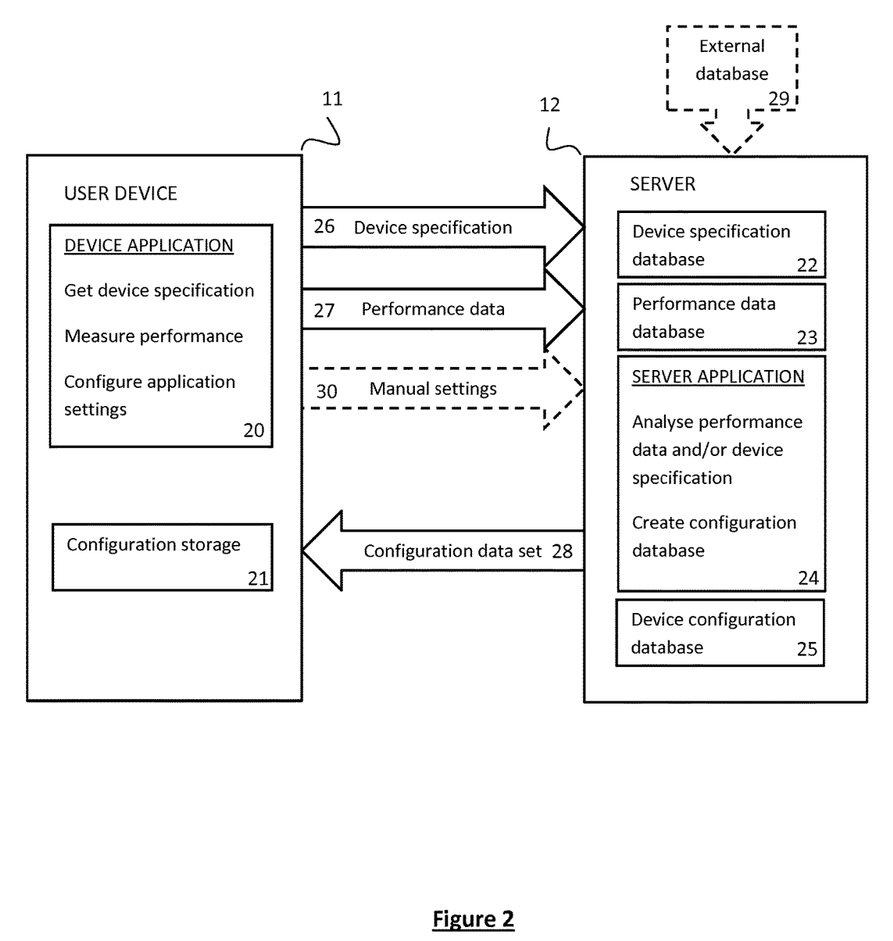
FIG. 2 is a flow chart illustrating an example embodiment.

FIG. 2 illustrates a simplified block diagram of an example embodiment. User device 11 comprises at least one device application 20, which can be any kind of application or a set of applications running on the user device 11. The device application 20 may be for example a game, a messaging application, a picture-, video-, text-, worksheet- etc. editor, music or video player and so on. In addition to the main purpose the device application 20 may be configured to perform tasks relating to configuring settings affecting some characteristics of the device application 20. The tasks may include obtaining device specification information of the user device 11. The tasks may also include measuring and gathering performance data of the user device 11 running the device application 20. The tasks may also include storing configuration data set to a configuration storage 21 which may be included in the device application 20 or be a separate entity. The device application may also be configured to send information relating to the device specification information 26 and/or the performance data 27 to the server 12. The device application 20 may also be configured to send user defined manual settings 30 to the server 12. The device specification information may be sent automatically at specific instances, for example periodically at pre-set times, when a change is detected in the user device etc. The device specification information may also be sent when initiated by an external source like the server 12 or initiated by the user.

Figure 3:
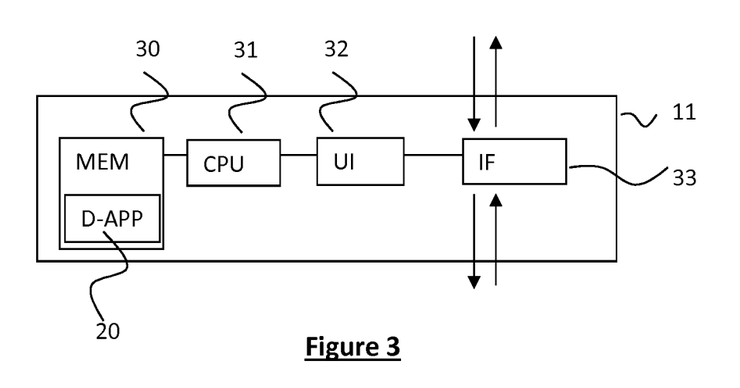
FIG. 3 illustrates a block diagram of an example user device.

FIG. 3 illustrates an example user device 11. The user device 11 may comprise a memory 30 (MEM) for storing the device application 20 (D-APP). The memory 30 may comprise volatile or non-volatile memory, for example EEPROM, ROM, PROM, RAM, DRAM, SRAM, firmware, programmable logic, etc. The user device 11 may further comprise one or more processor units 31 (CPU) for processing instructions and running computer programs, like the device application 20, an user interface 32 (UI) for giving instructions to the computer programs and representing information to the user and an interface unit 33 (IF) for sending and receiving messages.

Looking back on FIG. 2, the simplified block diagram further illustrates the server 12 comprising at least one server application 24, which can be any kind of application or a set of applications running on the server 12. The server application 24 may be configured to perform tasks related to configuring settings affecting some characteristics of the device application 20. The tasks may include receiving at least one of the device specification information 26, performance data 27 and manual settings 30 and analysing the received information included in at least one of the device specification information 26, the performance data 27 and manual settings 30. The tasks may also include creating a configuration database for user devices 11. The tasks may also include maintaining databases like a device specification database 22, a performance data database and a device configuration database 25. The databases 22, 23, 25 may be included in the server application 25 or they can be separate entities on the server 12 or on a remote place connected to the server 12. The server is further configured to send a configuration data set 28 to the user device 11.

The server 12 may also be configured to optionally receive information from at least one external database 29. The external database 29 may be offered for example by a service provider analysing devices and measuring their performances using various testing methods.

Figure 4:
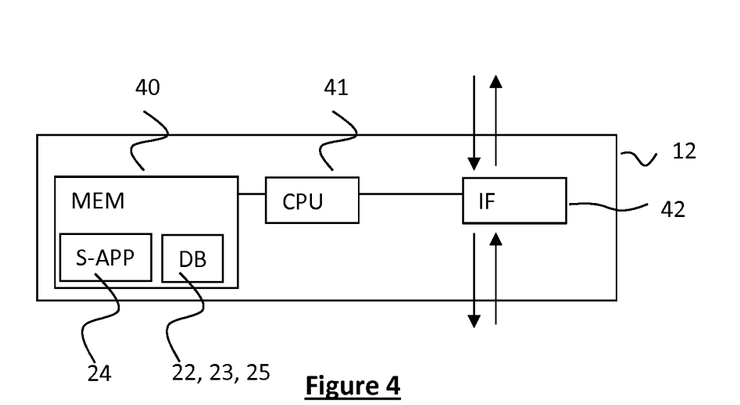
FIG. 4 illustrates a block diagram of an example server.

FIG. 4 illustrates an example server 12. The server 12 may be a physical or virtual computational entity capable of enhancing information and to perform computational tasks. The server 12 may be arranged to respond to requests across an example network to provide, or help to provide service. The server 12 may act on client-server architecture serving requests of at least one user device 11 or at least one D-APP running on the at least one user device 11. The server 12 may refer to one entity or a group on entities configured to operate jointly. In an example embodiment the server 12 may be a server device comprising a memory 40 (MEM) for storing the server application 24 (S-APP). The memory 40 may comprise volatile or non-volatile memory, for example EEPROM, ROM, PROM, RAM, DRAM, SRAM, firmware, programmable logic, etc. The server 12 may further comprise one or more processor units 41 (CPU) for processing instructions and running computer programs, like the server application 24 and any of the databases 22, 23, 24, and an interface unit 42 (IF) for sending and receiving messages.

Figure 5:
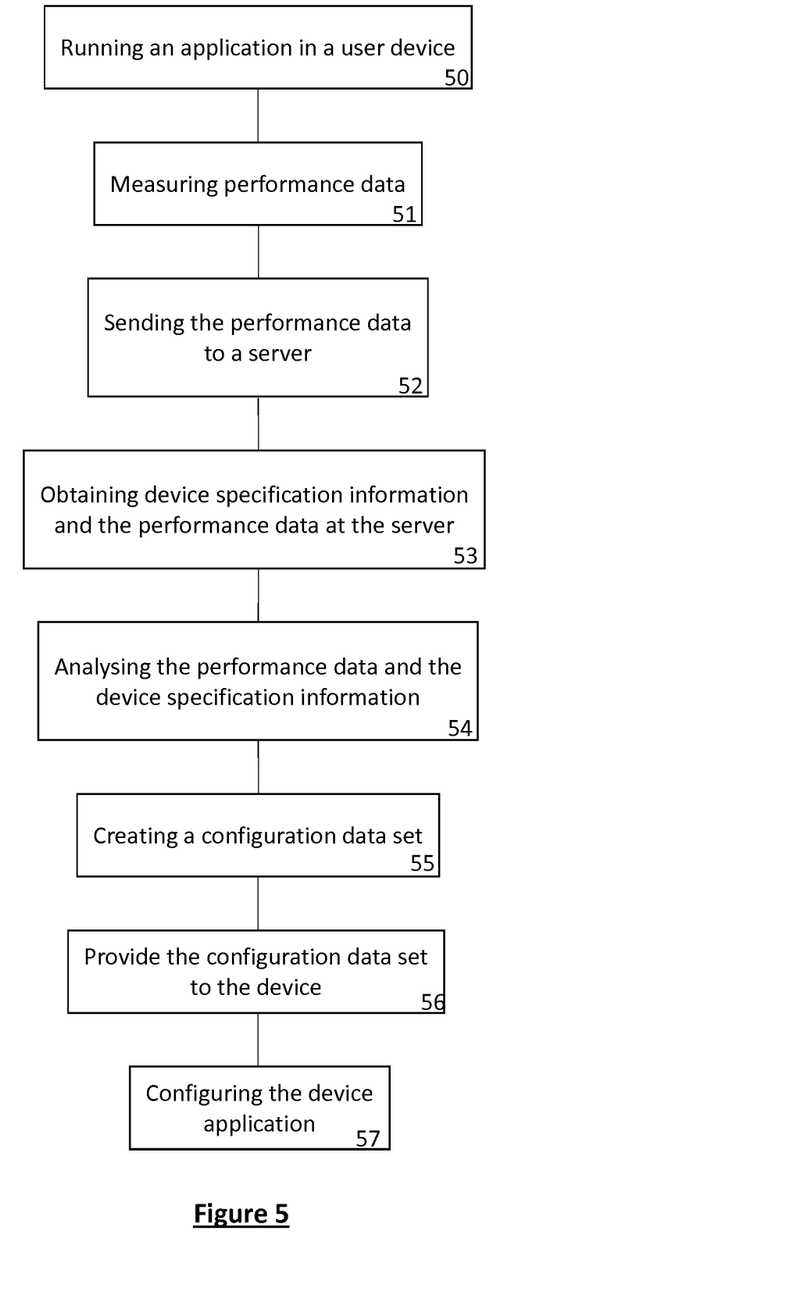
FIG. 5 is a flow chart illustrating a method according to an example embodiment of the invention.

FIG. 5 illustrates an example method in a system according to an example embodiment. Step 50: the device application 20 is running in the user device 11. Step 51: performance of the user device 11 running the device application 20 is measured. Step 52: the measured performance data is sent to the server 12. Step 53: the device specification information of the user device 11 is obtained at the server 12. The device specification information or an identifier associated with the device specification information may be retrieved or received from the user device 11 or it may be obtained from a database at the server 12 or from a remote source.

Step 54: the performance data and the device specific information are analysed at the server 12 by the server application (S-APP) 24. Step 55: a configuration data set is created using at least one of the device specification information or the performance data. Step 56: the configuration data set is provided to the user device 11. Step 57: the device application (D-APP) 20 is configured at least partly according to the configuration data set.

Figure 6:
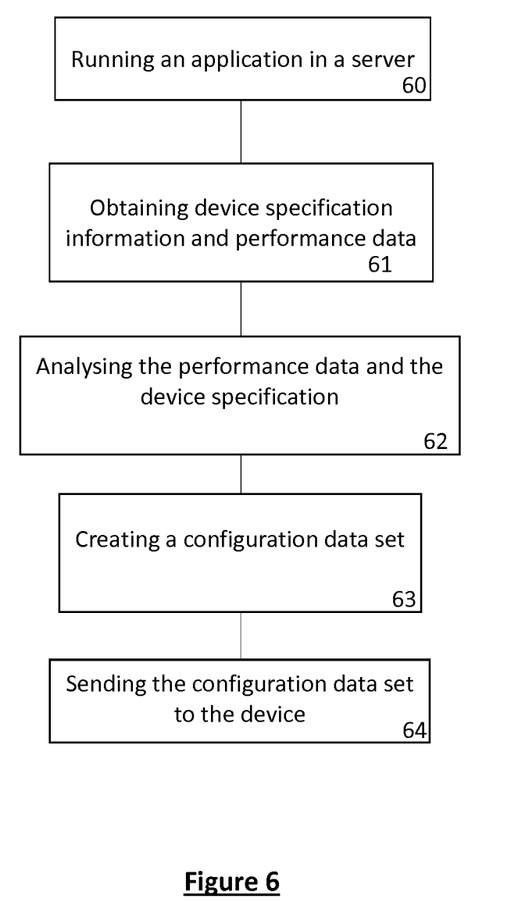
FIG. 6 is another flow chart illustrating a method according to an example embodiment of the invention.

FIG. 6 illustrates an example method in the server 12 according to an example embodiment. Step 60: the server application 24 is running in the server 12. The server application obtains device specification information which may be retrieved or received from the user device 11 or obtained from a database at the server 12 or from a remote source. Step 62: the performance data and the device specific information are analysed at the server 12 by the server application 24. Step 63: a configuration data set is determined using at least at least one of the device specification information or the performance data. Step 64: the configuration data set is provided to the user device 11.

Figure 7:
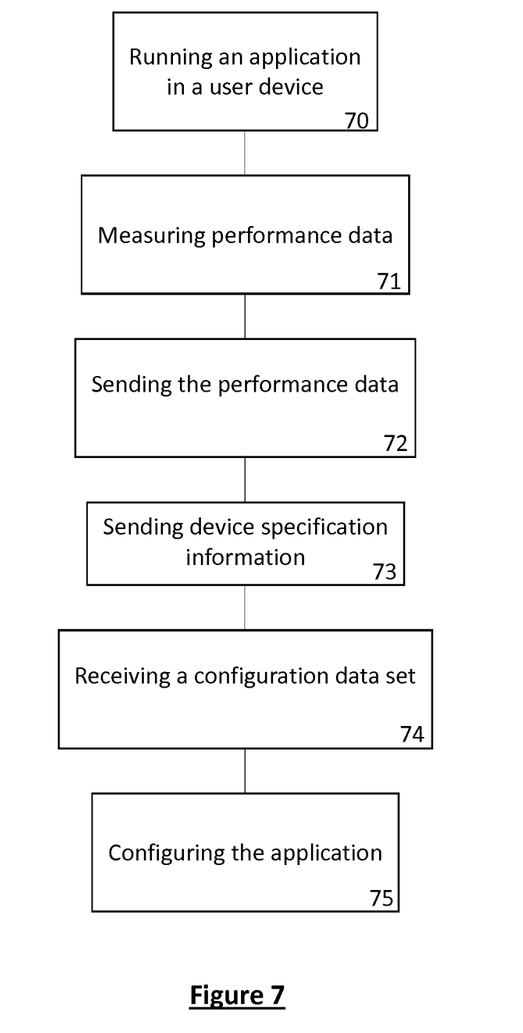
FIG. 7 is another flow chart illustrating a method according to an example embodiment of the invention.

FIG. 7 illustrates an example method in the user device 11 according to an example embodiment. Step 70: the device application 20 is running in the user device 11. Step 71: performance of the user device 11 running the device application 20 is measured. Step 72: the measured performance data is sent to the server 12. Step 73: The device specification information or an identifier associated with the device specification information is sent to the server 12. Step 74: a configuration data set is received at the user device 11. Step 75: the device application is configured at least partly according.

According to a generic example embodiment configuration can be seen as a continuous process. A device application may have initially a predefined configuration setup obtained for example when a device application is installed or launched for the first time. By executing for example the example method disclosed in FIG. 7 the device application obtains a new configuration data set and configures the device application accordingly. The example method may be executed again to get feedback how the configuration data set affects the measured performance data. This feedback loop provides a powerful tool to automatically define an optimal configuration data set for the user application running on a specific user device or a group of user devices. The configuration data set may then be distributed to all user devices belonging to the group of devices.

The identifier identifying the device type or model may be requested from a user device 11 for example using an application programming interface (API) offered to application developers by device manufacturers or operating system providers. The API may be offered for example on a developer web site. The API may be arranged to return values for example request like "model" from the user device 11. Using the API, the user device 11 may return for example value "ABC-123", which is the model of the user device 11, for the request "model". It is possible that different types or models of the same model return the same value "ABC-123" and thus the identities are not always unique.

The API may also include other requests to look into device specification information about the user device 11. The requests may include "product", "board", "device", "hardware" etc. which may be combined with the "model"-request or used in any combination thereof to obtain device specific information.

According to one example embodiment of the present invention it is possible to gather values for the combinations of request mentioned above for creating unique identifiers for different versions or builds of the same device model. These unique identifiers can be used to for example store and retrieve the device specification information. This may be useful for example in a situation where hardware composition of a user device 11 is changed during products lifecycle but the device model remains the same.

It is also possible that different user device 11 models from the same or different manufacturers include at least partly the same components, operating system etc.—thus having at least partly similar device information specification. This enables classifying the user devices 11 into device groups for which configuration data sets can be defined to making it unnecessary to define a specific configuration data set for each user device model available currently or in the future. Grouping may be based on at least one device specific piece of information or information relating to several parameters. As an example the grouping may be based on parameters, like amount of memory available, processor capacity, operating system version etc. The grouping may also be based on any combination of parameters. The grouping does not have to utilise information about the manufacturer or the model of the user device 11. User devices 11 may come from different manufacturers with the same operating system, same or essentially similar processor, amount of memory within defined boundaries etc.

Gathering performance data from multiple user devices 11 with similar device specification information, allows utilisation of statistical methods to filter out divergent values in received performance data. For example if the user device is running several applications at the same time or it is running out of memory the measured performance data may give misleading results.

In some embodiments it may be favourable to filter such results out.

Gathering both performance data and device specification information may include characteristics typical for crowdsourcing, where the information is received from a large group of people and their devices and the received information may be used to build for example a performance data database, a device specification information database and a configuration data set database.

Let us consider an example, where the user device 11 is a mobile phone, the device application 20 is a game and the server 12 is a game server. The game is installed on the mobile phone by the user and launched. Launching the game launches also a process for retrieving specification information of the mobile phone, including make and model of the phone and information about the components used in the device. The specification information is sent to the game server. The specification information may include manufacturer: PhoneCompany, model: ABC-123, operating system: xyz1.0, processor: alfa and so on.

When the game is running in the mobile phone, performance in a certain phase is measured—let say frames per second, FPS rate during an animation phase in a pre-defined level. The measured FPS is sent to the game server, where it is analysed together with the specification information. Using the specification information, a game server application at the game server checks a database if a configuration data set exists for the mobile phone. The game server application also stores the received specification information to the database. If a suitable configuration data set exists, it is sent to the mobile phone, where the game obtains the configuration and the FPS may be measured and sent to the game server again. In case that the new measurement indicates desired values for the FPS the configuration data set may be associated to the mobile phone and other devices with similar specification information.

If a suitable configuration data set does not exist, the received specification information may be stored to the database and it may be used in creating a new configuration data set. In a situation where the suitable configuration does not exist for the device an alternative configuration data set may be selected and provided. The alternative configuration data set may be for example one of an almost similar device with almost similar device specification information. Furthermore in a situation where the suitable configuration does not exist for the device it may be decided not to provide the configuration data set at all.

Let us consider another example, where the user device 11 is a tablet device, the device application 20 is a video player and the server 12 is a video server. The video player is installed on the tablet device by the user and launched. Launching the video player launches also a process for retrieving specification information of the tablet device, including make and model of the tablet device and information about the components used in the tablet device. The specification information is sent to the video server. The specification information may include manufacturer: TabletCompany, model: DEF-456, operating system: xyz1.0, processor: beta and so on.

When the video player is running in the tablet device, performance in a certain phase is measured—let say frames per second, FPS rate during a defined phase of a video clip. The measured FPS is sent to the video server, where it is analysed together with the specification information. Using the specification information, a video server application at the video server checks a database if a configuration data set exists for the tablet device. The video server application also stores the received specification information to the database. If a suitable configuration data set exists, it is sent to the tablet device, where the video player obtains the configuration and the FPS may be measured and sent to the video server again. In case that the new measurement indicates desired values for the FPS the configuration data set may be associated to the tablet device and other devices with similar specification information.

At least some of the example embodiments enable providing optimized settings for an application running in various user devices. End users are able to enjoy the best possible experience their device is capable of. If the user device is a high-end device capable of providing high performance the settings are defined accordingly and if the user device has some deficiencies, those can be taken into account and optimize the settings so that the end user may still enjoy using the application. For example the high-end device may comprise resources for providing video content, more detailed graphics, more processing power, user interface features etc. In addition the high-end device may comprise additional technologies and/or applications like GPS, assisted GPS, maps, navigation, stereo sound, multi-channel sound, surround sound, 3D display etc. The non-exhaustive list of example features listed here may be currently typical for high-end devices but likely will be available in lower-end devices in the future, too. New technologies and applications will be introduced to the user devices in the future and defining configuration settings also to those falls into the scope of this invention.

It is apparent to a person skilled in the art that as technology advances, the basic idea of the invention can be implemented in various ways. The invention and its embodiments are therefore not restricted to the above examples, but they may vary within the scope of the claims.

The invention claimed is:

1. A method comprising:
    obtaining, by a server, device specification information of at least one user device, wherein the device specification information comprises technical capabilities of the at least one user device, and wherein the obtaining of the device specification information further comprises crowdsourcing the device specification information from multiple other user devices;
    obtaining, by the server, performance data of the at least one user device, wherein the obtaining of the performance data of the at least one user device comprises crowdsourcing the performance data from multiple other user devices of other users, the multiple other user devices having at least partly shared device specification information with the at least one user device, and wherein the performance data comprises measureable characteristics of at least one application and the at least one user device upon which the at least one application runs, wherein the measurable characteristics comprise at least one of loading time of the at least one application, frames per second rate, power consumption, memory consumption, or processor load of the at least one user device;
    obtaining, by the server, user-defined manual settings of the at least one user device;
    analysing, by the server, the performance data, the device specification information, and the user-defined manual settings to identify divergent values in the obtained performance data, wherein the divergent values in the obtained performance data are filtered out;
    determining, by the server, a configuration data set based on the analysis, wherein the configuration data set comprises settings of the at least one application operating on the user device, and wherein the configured data set comprises at least one of display resolution, frame rate, information on activation or deactivation of features of the at least one application, or audio settings; and
    sending, from the server, the configuration data set to the user device for automatically configuring the settings of the at least one application operating on the user device.

2. The method of claim 1, further comprising maintaining a performance data database for storing the performance data.

3. The method of claim 2, further comprising maintaining a device specification information database for storing the device specification information.

4. The method of claim 1, further comprising maintaining a configuration data set database for storing the configuration data set.

5. The method of claim 4, further comprising associating the at least one user device with the configuration data set.

6. The method of claim 5, further comprising storing information of the associated at least one user device with the configuration data set into the configuration data set.

7. The method of claim 1, further comprising forming at least one group of a plurality of user devices using the device specification information.

8. The method of claim 7, further comprising associating one or more groups of the at least one group with the configuration data set.

9. The method of claim 8, further comprising storing information of the associated one or more groups of the at least one group with the configuration data set.

10. An apparatus comprising at least one processing core, at least one memory including computer program code, wherein the at least one memory and the computer program code are configured to, with the at least one processing core, cause the apparatus at least to:
    obtain, by a server, device specification information of at least one user device, wherein the device specification information comprises technical capabilities of the at least one user device, and wherein the obtaining of the device specification information further comprises crowdsourcing the device specification information from multiple other user devices;
    obtain, by the server, performance data of the at least one user device, wherein the obtaining of the performance data of the at least one user device comprises crowdsourcing the performance data from multiple other user devices of other users, the multiple other user devices having at least partly shared device specification information with the at least one user device, and wherein the performance data comprises measureable characteristics of at least one application and the at least one user device upon which the at least one application runs, wherein the measurable characteristics comprise at least one of loading time of the at least one application, frames per second rate, power consumption, memory consumption, or processor load of the at least one user device;
    obtain, by the server, user-defined manual settings of the at least one user device;
    analyse, by the server, the performance data, the device specification information, and the user-defined manual settings to identify divergent values in the obtained performance data, wherein the divergent values in the obtained performance data are filtered out;
    determine, by the server, a configuration data set based on the analysis, wherein the configuration data set comprises settings of the at least one application operating on the user device, and wherein the configured data set comprises at least one of display resolution, frame rate, information on activation or deactivation of features of the at least one application, or audio settings; and
    send, from the server, the configuration data set to the user device for automatically configuring the settings of the at least one application operating on the user device.

11. A non-transitory computer-readable medium that contains computer readable instructions which, when executed by at least one data processor, cause an apparatus to:
    obtain, by a server, device specification information of at least one user device, wherein the device specification information comprises technical capabilities of the at least one user device, and wherein the obtaining of the device specification information further comprises crowdsourcing the device specification information from multiple other user devices;

obtain, at the server, performance data of at least one user device, wherein the obtaining of the performance data of the at least one user device comprises crowdsourcing the performance data from multiple other user devices of other users, the multiple other user devices having at least partly shared device specification information with the at least one user device, and wherein the performance data comprises measureable characteristics of at least one application and the at least one user device upon which the at least one application runs, wherein the measurable characteristics comprise at least one of loading time of the at least one application, frames per second rate, power consumption, memory consumption, or processor load of the at least one user device;

obtain, by the server, user-defined manual settings of the at least one user device;

analyse, by the server, the performance data, the device specification information, and the user-defined manual settings to identify divergent values in the obtained performance data, wherein the divergent values in the obtained performance data are filtered out;

determine, at the server, a configuration data set based on the analysis, wherein the configuration data set comprises settings of the at least one application operating on the user device, and wherein the configured data set comprises at least one of display resolution, frame rate, information on activation or deactivation of features of the at least one application, or audio settings; and send, from the server, the configuration data set to the user device for automatically configuring the settings of the at least one application operating on the user device.

12. The non-transitory computer-readable medium of claim 11, further causing the apparatus to maintain a performance data database for storing the performance data.

13. The non-transitory computer-readable medium of claim 12, further causing the apparatus to maintain a device specification information database for storing the device specification information.

14. The non-transitory computer-readable medium of claim 11, further causing the apparatus to maintain a configuration data set database for storing the configuration data set.

15. The non-transitory computer-readable medium of claim 13, further causing the apparatus to associate the at least one user device with the configuration data set.

16. The non-transitory computer-readable medium of claim 15, further causing the apparatus to store information of the associated at least one user device with the configuration data set into the configuration data set.

17. The non-transitory computer-readable medium of claim 11, further causing the apparatus to form at least one group of a plurality of user devices using the device specification information.

18. The non-transitory computer-readable medium of claim 17, further causing the apparatus to associate one or more groups of the at least one group with the configuration data set.

19. The non-transitory computer-readable medium of claim 18, further causing the apparatus to store information of the associated one or more groups of the at least one group with the configuration data set.

* * * * *